United States Patent
Goss et al.

(10) Patent No.: US 9,552,288 B2
(45) Date of Patent: Jan. 24, 2017

(54) MULTI-TIERED MEMORY WITH DIFFERENT METADATA LEVELS

(71) Applicant: Seagate Technology LLC, Cupertino, CA (US)

(72) Inventors: Ryan James Goss, Prior Lake, MN (US); Mark Allen Gaertner, Vadnais Heights, MN (US); Michael Joseph Steiner, Saint Paul, MN (US)

(73) Assignee: Seagate Technology LLC, Cupertino, CA (US)

( * ) Notice: Subject to any disclaimer, the term of this patent is extended or adjusted under 35 U.S.C. 154(b) by 318 days.

(21) Appl. No.: 13/762,882

(22) Filed: Feb. 8, 2013

(65) Prior Publication Data

US 2014/0229656 A1  Aug. 14, 2014

(51) Int. Cl.
| | |
|---|---|
| *G06F 12/00* | (2006.01) |
| *G06F 12/02* | (2006.01) |
| *G06F 12/06* | (2006.01) |
| *G06F 3/06* | (2006.01) |

(52) U.S. Cl.
CPC ........... *G06F 12/0246* (2013.01); *G06F 3/061* (2013.01); *G06F 3/0649* (2013.01); *G06F 3/0685* (2013.01); *G06F 12/0238* (2013.01); *G06F 12/0653* (2013.01); *G06F 3/0643* (2013.01); *G06F 2212/261* (2013.01)

(58) Field of Classification Search
CPC ... G06F 12/0246; G06F 3/0679; G11C 16/102
USPC ........................................................ 711/103
See application file for complete search history.

(56) References Cited

U.S. PATENT DOCUMENTS

| | | | |
|---|---|---|---|
| 7,146,377 B2 | 12/2006 | Nowicki et al. | |
| 7,386,552 B2 | 6/2008 | Kitamura et al. | |
| 7,653,836 B1 | 1/2010 | Chatterjee et al. | |
| 8,463,825 B1* | 6/2013 | Harty et al. | 707/813 |
| 8,538,998 B2* | 9/2013 | Barrow | 707/802 |
| 8,560,729 B2* | 10/2013 | Jabri et al. | 709/246 |
| 8,843,459 B1* | 9/2014 | Aston et al. | 707/694 |
| 2002/0143773 A1 | 10/2002 | Spicer et al. | |
| 2003/0204699 A1 | 10/2003 | Talagala et al. | |
| 2006/0149902 A1 | 7/2006 | Yun et al. | |
| 2009/0172259 A1 | 7/2009 | Prins et al. | |
| 2011/0289049 A1* | 11/2011 | Zeng et al. | 707/611 |
| 2012/0023282 A1* | 1/2012 | Rub | 711/103 |
| 2012/0079192 A1* | 3/2012 | Jaquette | 711/114 |
| 2012/0271982 A1* | 10/2012 | Callaghan | 711/103 |
| 2013/0019072 A1* | 1/2013 | Strasser | G06F 11/1044 711/154 |
| 2013/0073789 A1* | 3/2013 | Khmelnitsky et al. | 711/103 |
| 2013/0080732 A1* | 3/2013 | Nellans et al. | 711/206 |
| 2013/0138908 A1* | 5/2013 | Iwasaki | 711/165 |
| 2014/0082310 A1* | 3/2014 | Nakajima | 711/162 |

(Continued)

*Primary Examiner* — Charles Rones
*Assistant Examiner* — Nanci Wong
(74) *Attorney, Agent, or Firm* — Hall Estill Attorneys at Law

(57) ABSTRACT

Method and apparatus for managing data in a memory. In accordance with some embodiments, a data object is stored in a first non-volatile tier of a multi-tier memory structure. A metadata unit is generated to describe the data object, the metadata unit having a selected granularity. The metadata unit is stored in a different, second non-volatile tier of the multi-tier memory structure responsive to the selected granularity.

17 Claims, 4 Drawing Sheets

(56) References Cited

U.S. PATENT DOCUMENTS

2014/0208017 A1* 7/2014 Benhase ............. G06F 12/0806
711/113

* cited by examiner

MULTI-TIERED MEMORY WITH DIFFERENT METADATA LEVELS

SUMMARY

Various embodiments of the present disclosure are generally directed to managing data in a data storage device.

In accordance with some embodiments, a data object is stored in a first non-volatile tier of a multi-tier memory structure. A metadata unit is generated to describe the data object, the metadata unit having a selected granularity. The metadata unit is stored in a different, second non-volatile tier of the multi-tier memory structure responsive to the selected granularity.

These and other features and aspects which characterize various embodiments of the present disclosure can be understood in view of the following detailed discussion and the accompanying drawings.

DETAILED DESCRIPTION

Figure 1:
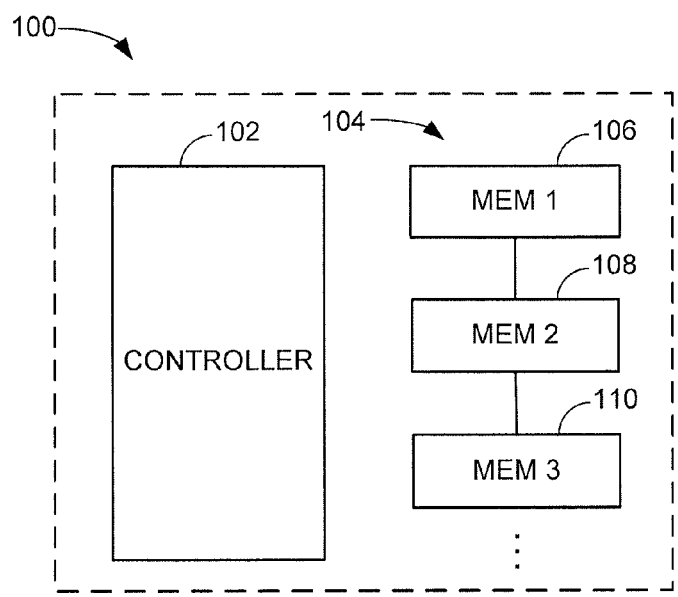
FIG. 1 provides is a functional block representation of a data storage device in accordance with various embodiments of the present disclosure.

The present disclosure generally relates to the management of data in a data storage device.

Data storage devices generally operate to store blocks of data in memory. The devices can employ data management systems to track the physical locations of the blocks so that the blocks can be subsequently retrieved responsive to a read request for the stored data. The device may be provided with a hierarchical (multi-tiered) memory structure with different types of memory to accommodate data having different attributes and workloads. The various memory tiers may be erasable or rewriteable.

Erasable memories (e.g, flash memory, write many optical disc media, etc.) are non-volatile memories that usually require an erasure operation before new data can be written to a given memory location. It is thus common in an erasable memory to write an updated data set to a new, different location and to mark the previously stored version of the data as stale.

Rewriteable memories (e.g., dynamic random access memory (DRAM), resistive random access memory (RRAM), magnetic disc media, etc.) may be volatile or non-volatile, and are rewriteable so that an updated data set can be overwritten onto an existing, older version of the data in a given location without the need for an intervening erasure operation.

Metadata can he generated and maintained to track the locations and status of the stored data. The metadata tracks the relationship between logical elements (such as logical block addresses, LBAs) stored in the memory space and physical locations (such as physical block addresses, PBAs) of the memory space. The metadata can also include state information associated with the stored data and/or the memory location of the stored data, such as the total number of accumulated writes/erasures/reads, aging, drift parametrics, estimated or measured wear, etc.

Data management systems often extend considerable effort to maintain the metatadata in an up-to-date and accurate condition, since the metadata are used to retrieve data responsive to host data requests. While existing metadata management schemes are operable, there is a need for improvements in the manner in which metadata are generated, stored and managed.

Various embodiments of the present disclosure provide a multi-tiered memory structure adapted to store data objects and associated metadata. As explained below, a data object is stored in a first non-volatile memory tier of the multi-tiered memory structure. A metadata unit is generated to describe the data object, and the metadata unit is stored in a different, second non-volatile memory tier of the multi-tiered memory structure. The metadata unit has a selected granularity responsive to usage characteristics of the data object.

Mechanisms are provided to select the respective tiers in which the data objects and metadata are stored based on a number of attributes of the user data, memory and/or workload. In this way, the size and the update frequency of the metadata unit can be paired to the type of media to which the metadata unit is stored.

These and other features of various embodiments can be understood beginning with a review of FIG. 1, which provides a functional block representation of a data storage device 100. The device 100 includes a controller 102 and a multi-tiered memory structure 104. The controller 102 provides top level control of the device 100, and the memory structure 104 stores and retrieves user data from/to a requestor entity, such as an external host device (not separately shown).

The memory structure 104 includes a number of memory tiers 106, 108 and 110 denoted as MEM 1-3. The number and types of memory in the various tiers can vary as desired. Generally, the higher tiers in the memory structure 104 may be constructed of smaller and/or faster memory and the lower tiers in the memory structure may be constructed of larger and/or slower memory.

For purposes of providing one concrete example, the system 100 is contemplated as a flash memory-based storage device, such as a solid state drive (SSD), a portable thumb drive, a memory stick, a memory card, a hybrid storage device, etc. so that at least one of the lower memory tiers provides a main store that utilizes erasable flash memory. At least one of the higher memory tiers provides rewriteable non-volatile memory such as resistive random access memory (RRAM), phase change random access memory (PCRAM), spin-torque transfer random access memory (STRAM), etc. This is merely illustrative and not limiting.

Other levels may be incorporated into the memory structure, such as volatile or non-volatile cache levels, buffers, etc.

Figure 2:
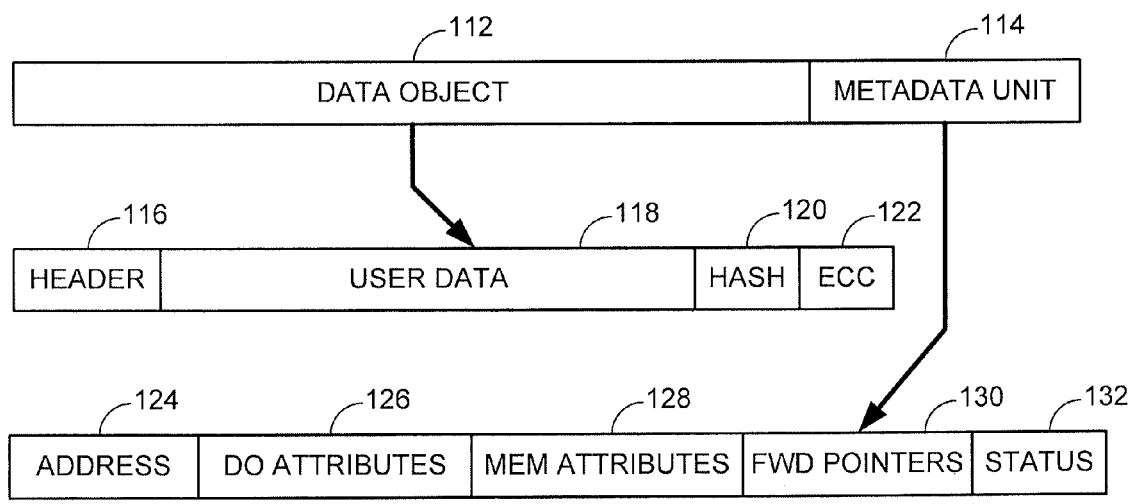
FIG. 2 illustrates exemplary formats for a data object and a corresponding metadata unit used to describe the data object.

FIG. 2 illustrates exemplary formats for a data object 112 and associated metadata unit 114 that can be used by the device 100 of FIG. 1. Other formats may be used. The data object 112 is managed as an addressable unit and may be formed from one or more data blocks supplied by the requestor (host). The metadata unit 114 provides control information to enable the device 100 to locate and retrieve the previously stored data object 112. The metadata unit 114 will tend to be significantly smaller (in terms of total number of bits) than the data object 112 to maximize data storage capacity of the device 100.

The data object 112 includes header information 116, user data 118, one or more hash values 120 and error correction code (ECC) information 122. The header information 116 may be the LBA value(s) associated with the user data 118 or other useful identifier information. The user data 118 comprise the actual substantive content supplied by the requestor for storage by the device 100.

The hash value 120 can be generated from the user data 118 using a suitable hash function, such as a Sha hash, and can be used to reduce write amplification by comparing the hash value of a previously stored LBA (or range of LBAs) to the hash value for a newer version of the same LBA (or range of LBAs). If the hash values match, the newer version may not need to be stored to the structure 104 as this may represent a duplicate set of the same user data.

The ECC information 122 can take a variety of suitable forms such as outercode, parity values, IOEDC values, etc., and is used to detect and correct up to a selected number of errors in the data object during read back of the data.

The metadata unit 114 may include a variety of different types of control data such as data object (DO) address information 124, DO attribute information 126, memory (MEM) attribute information 128, one or more forward pointers 130 and a status value 132. Other metadata unit formats can be used. The address information 124 identifies the physical address of the data object 112, and may provide logical to physical address conversion information as well. The physical address will include which tier (e.g., MEM 1-3 in FIG. 1) stores the data object 112, as well as the physical location within the associated tier at which the data object 112 is stored using appropriate address identifiers such as row (cache line), die, array, plane, erasure block, page, bit offset, and/or other address values.

The DO attribute information 126 identifies attributes associated with the data object 112, such as status, revision level, timestamp data, workload indicators, etc. The memory attribute information 128 provides parametric attributes associated with the physical location at which the data object 112 is stored. Examples include total number of writes/erasures, total number of reads, estimated or measured wear effects, charge or resistance drift parameters, bit error rate (BER) measurements, aging, etc. These respective sets of attributes 128, 130 can be maintained by the controller and/or updated based on previous metadata entries.

The forward pointers 130 are used to enable searching for the most current version of the data object 112. The status value(s) 132 indicate the current status of the associated data object (e.g., stale, valid, etc.).

Figure 3:
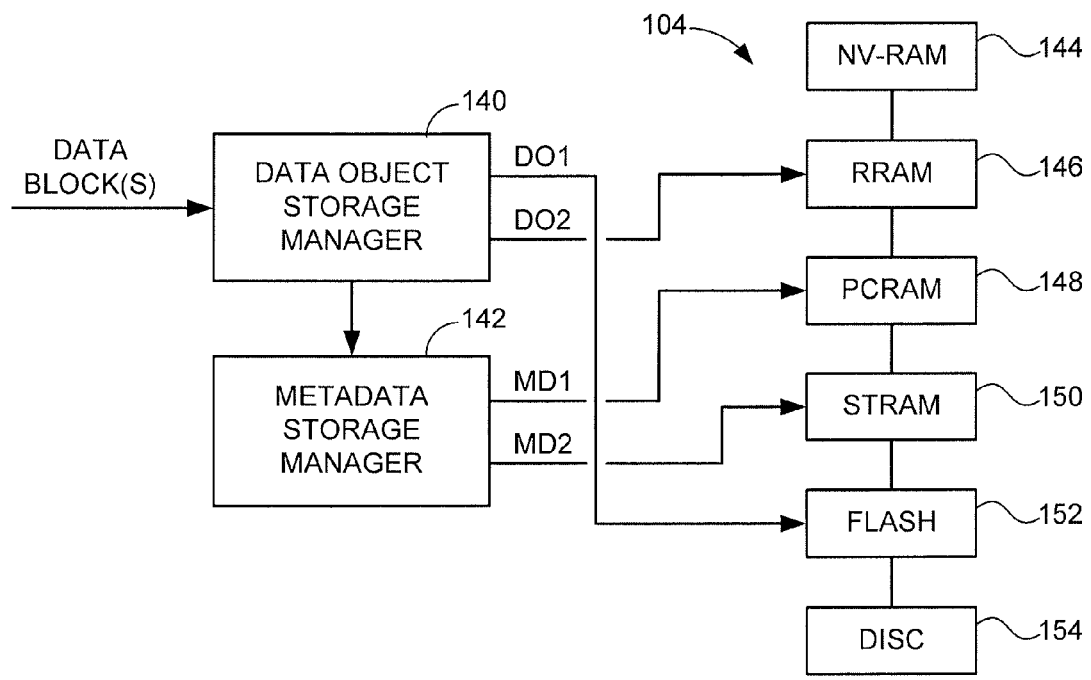
FIG. 3 depicts portions of the device of FIG. 1 in greater detail.

FIG. 3 is a functional block representation of portions of the device 100 in accordance with some embodiments. Each time the device 100 receives one or more data blocks (LBAs) from the requestor for storage to the memory structure 104, a data object (DO) storage manager 140 generates a data object such as 112 in FIG. 2, and a metadata (MD) storage manager 142 generates a corresponding metadata unit such as 114. The respective storage managers 140, 142 evaluate a number of attributes to form the respective data object and metadata unit, and determine an appropriate memory tier in the structure 104 for the storage of each.

The data object (DO) and the metadata unit (MD) may be stored in the same tier, but it is contemplated that different tiers will often be used for these respective types of data based on the characteristics of the user data and the memory. In some cases, the MD unit will be stored in a lower tier as compared to the DO. In other cases, the MD unit will be stored in a higher tier as compared to the DO. The granularity of the MD unit can be selected in response to characteristics of the DO, and the memory tier for the MD unit can in turn be selected based on the selected MD granularity.

The multi-tiered memory structure 104 is shown in FIG. 3 to include a number of exemplary tiers including an NV-RAM module 144, an RRAM module 146, a PCRAM module 148, an STRAM module 150, a flash module 152 and a disc module 154. These are merely exemplary as any number of different types and arrangements of memory modules can be used in various tiers as desired.

The NV-RAM 144 comprises volatile SRAM or DRAM with a dedicated battery backup or other mechanism to maintain the stored data in a non-volatile state. The RRAM 146 comprises an array of erasable non-volatile memory cells that store data in relation to different programmed electrical resistance levels responsive to the migration of ions across an interface. The PCRAM 148 comprises an array of phase change memory cells that exhibit different programmed resistances based on changes in phase of a material between crystalline (low resistance) and amorphous (high resistance).

The STRAM 150 comprises an array of memory cells each having at least one magnetic tunneling junction made up of a reference layer of material with a fixed magnetic orientation and a free layer having a variable magnetic orientation. The effective electrical resistance, and hence, the programmed state, of each MTJ can be established in relation to the programmed magnetic orientation of the free layer.

The flash memory 150 comprises an array of flash memory cells which store data in relation to an amount of accumulated charge on a floating gate structure. Unlike the NV-RAM 144, RRAM 146, PCRAM 148 and STRAM 150, which are all contemplated as comprising rewriteable non-volatile memory tiers, the flash memory 152 is erasable so that an erasure operation is generally required before a unit of data (e.g., an erasure block or larger garbage collection unit) can be reconditioned and returned to an allocation pool to receive newly written data. The flash memory cells can be configured as single level cells (SLCs) or multi-level cells (MLCs) so that each memory cell stores a single bit (in the case of an SLC) or multiple bits (in the case of an MLC).

The disc memory 154 may be magnetic rotatable media such as a hard disc drive (HDD) or similar storage device. Other sequences, combinations and numbers of tiers can be utilized as desired, including other forms of solid-state and/or disc memory, remote server memory, volatile and non-volatile buffer layers, processor caches, intermediate caches, etc.

It is contemplated that each tier will have its own associated memory storage attributes (e.g., capacity, data unit size, I/O data transfer rates, endurance, etc.). The highest order tier (e.g., the NV-RAM 144 in FIG. 3) will tend to have the fastest I/O data transfer rate performance (or other suitable performance metric) and the lowest order tier (e.g., the disc 154) will tend to have the slowest performance. Each of the remaining tiers will have intermediate performance characteristics in a roughly sequential fashion.

As shown by FIG. 3, the DO storage manager 140 generates two successive data objects in response to the receipt of different sets of data blocks from the requestor, a first data object (OB1) and a second data object (OB2). In the present example, the storage manager 140 directs the storage of the DO1 data in the flash memory 152, and directs the storage of the DO2 data in the RRAM module 146. The MD storage manager 142 generates two corresponding metadata units MD1 and MD2 for the first and second data objects OB1 and OB2. The MD1 unit is stored in the PCRAM 148, and the MD2 unit is stored in the STRAM 150. It will be appreciated that in each case, the specific memory tier for the storage of the data objects DO1 and DO2, and the corresponding metadata units MD1 and MD2, can be tailored to accommodate a number of factors as discussed in further detail below.

Figure 4A:
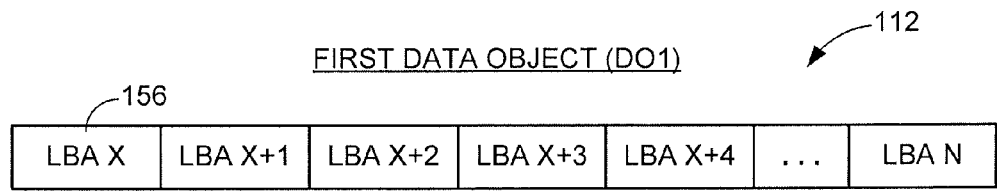
FIG. 4A provides an illustrative format for a first data object from FIG. 3.
Figure 4B:
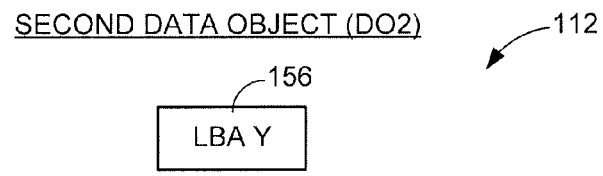
FIG. 4B is an illustrative format for a second data object from FIG. 3.

Although not limiting, it is contemplated that the first data object DO1 from FIG. 3 represents a relatively large amount of user data comprising multiple LBAs 156 (from LBA X to LBA N) as depicted in FIG. 4A. The corresponding metadata unit MD1 describes these LBAs and treats the overall data object DO1 as a single unit. As shown by FIG. 4B, the second data object DO2 from FIG. 3 comprises a single LBA 156 (LBA Y). The corresponding metadata unit MD2 describes the storage of the second data object DO2 with a smaller granularity than that of MD1. It will be appreciated that, in terms of overall size, the first data object DO1 will tend to be significantly larger than the second data object DO2, but accounting for the level of detail provided therein, the actual size of MD2 may be larger than, smaller than, or essentially the same size as, MD1.

Figure 5:
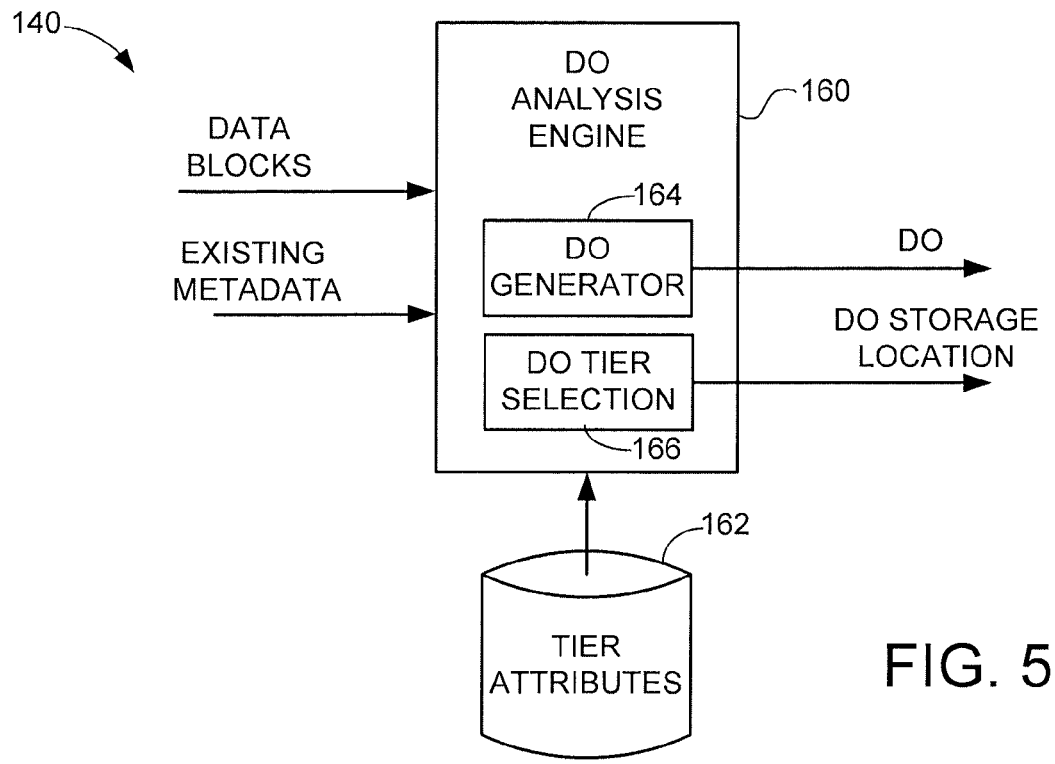
FIG. 5 depicts aspects of the data object storage manager of FIG. 3 in greater detail.

FIG. 5 depicts the DO storage manager 140 from FIG. 3 in accordance with some embodiments. A data object (DO) analysis engine 160 receives the data block(s) (LBAs 156) from the requestor as well as existing metadata (MD) stored in the device 100 associated with prior version(s) of the data blocks, if such have been previously stored to the memory structure 104. Memory tier attribute data maintained in a database 162 may be utilized by the engine 160 as well. The engine 160 analyzes the data block(s) to determine a suitable format and location for the data object. The data object is generated by a DO generator 164 using the content of the data block(s) as well as various data-related attributes associated with the data object. A tier selection module 166 selects the appropriate memory tier of the memory structure 104 in which to store the generated data object.

The arrangement of the data object, including overall data object size, may be matched to the selected memory tier; for example, page level data sets may be used for storage to the flash memory 152 and LBA sized data sets may be used for the RRAM, PCRAM and STRAM memories 146, 148 and 150. Other sizes can be used. The unit size of the data object may or may not correspond to the unit size utilized at the requestor level. For example, the requestor may transfer blocks of user data of nominally 512 bytes in size. The data objects may have this same user data capacity, or may have some larger or smaller amounts of user data, including amounts that are non-integer multiples of the requestor block size. The output DO storage location from the DO tier selection module 166 is provided as an input to the memory module 104 to direct the storage of the data object at the designated physical address in the selected memory tier.

Referring again to FIG. 3, the decision to store the DO2 data object data in the RRAM module 146 may be based on a predicted or observed higher write priority as compared to the DO1 data object which was stored to the flash memory 152. Other DO attributes may influence the selection of the appropriate tier for the storage of the data objects, including read priority (e.g., frequent read requests), requestor level status, spatial or temporal locality to other data blocks, etc.

Figure 6:
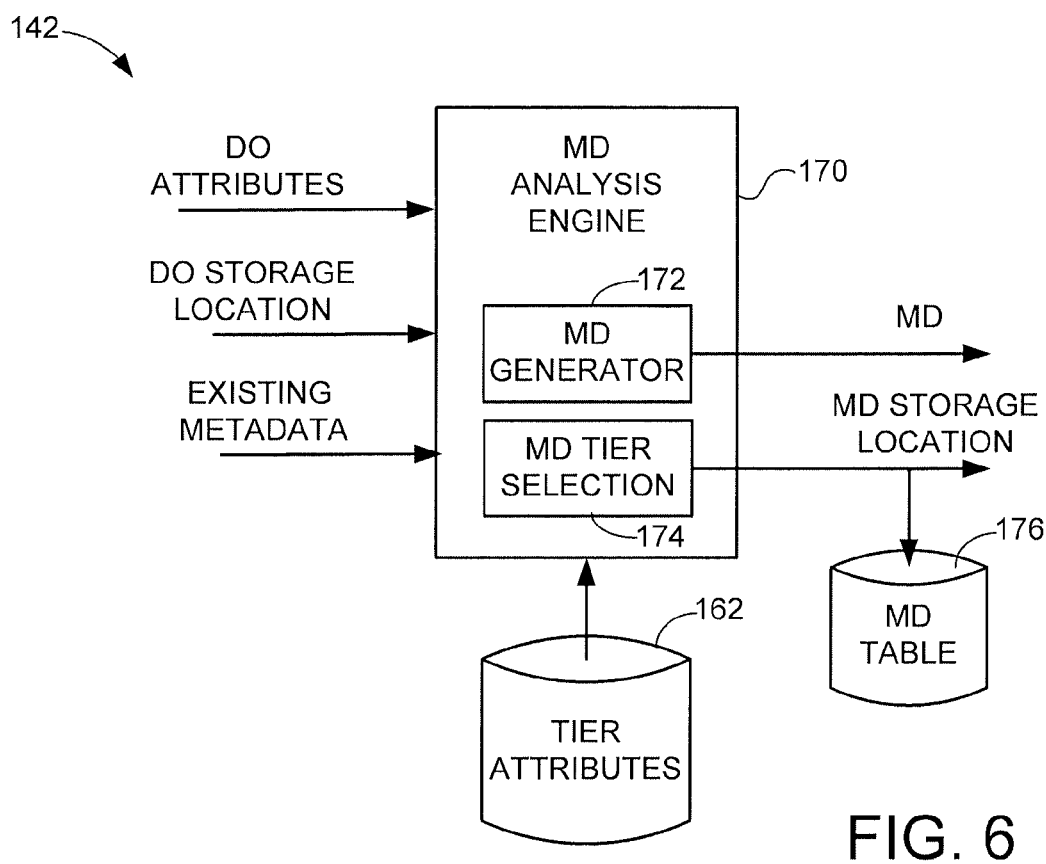
FIG. 6 shows aspects of the metadata storage manager of FIG. 3 in greater detail.

FIG. 6 depicts portions of the metadata (MD) storage manager 142 from FIG. 3 in accordance with some embodiments. An MD analysis engine 170 uses a number of factors such as the DO attributes, the DO storage location, the existing MD (if available) and memory tier information from the database 162 to select a format, granularity and storage location for the metadata unit 114. An MD generator 172 generates the metadata unit and a tier selection module 174 selects an appropriate tier level for the metadata. In some cases, multiple data objects may be grouped together and described by a single metadata unit.

As before, the MD tier selection module 174 outputs an MD storage location value that directs the memory structure 104 to store the metadata unit at the appropriate physical location in the selected memory tier. A top level MD data structure such as MD table 176, which may be maintained in a separate memory location or distributed through the memory structure 104, may be updated to reflect the physical location of the metadata for future reference. The MD data structure 176 may be in the form of a lookup table that correlates logical addresses (e.g., LBAs) to the associated metadata units.

Figure 7:
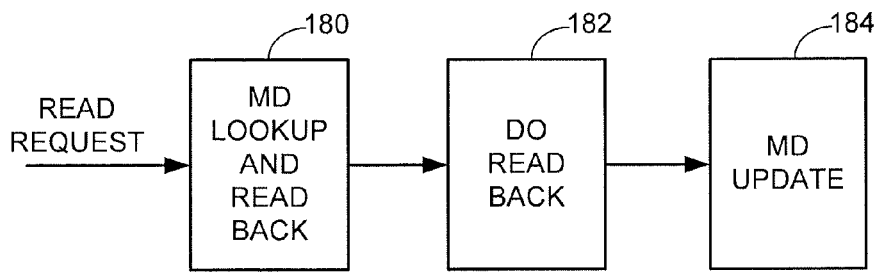
FIG. 7 represents a sequence of steps carried out in accordance with some embodiments to service read requests from a requestor.

Once the data objects and the associated metadata units are stored to the memory structure 104, read and write processing is carried out to service access operations requested by a requestor (e.g. host). As shown in FIG. 7, a read request for a selected LBA, or range of LBAs, is serviced by locating the metadata associated with the selected LBA(s) through access to the MD data structure 176 or other data structure, as represented at block 180. The physical location at which the metadata unit is stored is identified and a read operation is carried out to retrieve the metadata unit to a local memory (such as a volatile buffer memory of the device 100). The address information for the data object described by the metadata unit is extracted and used to carry out a read operation to retrieve a copy of the user data portion of the data object for transfer to the requestor, as represented at block 182.

As part of the read operation, the metadata unit may be updated to reflect an increase in the read count for the associated data object, block 184 (if such is stored at the MD level). Other parametrics relating to the memory may be recorded as well to the memory tier data structure 162 (FIGS. 5-6), such as observed bit error rate (BER), incremented read counts, measured drift parametrics, etc. It is contemplated, although not necessarily required, that the new updated metadata unit will be maintained in the same memory tier as before.

In the case of rewriteable memory tiers (e.g., tiers 144-150), the new updates to the metadata (e.g., incremented read count, state information, etc.) may be overwritten onto the existing metadata for the associated data object. For metadata stored to an erasable memory tier (e.g., flash memory 152), the metadata unit (or a portion thereof) may be written to a new location in the tier.

It is noted that a given metadata unit may be distributed across the different tiers so that portions requiring frequent updates are stored in one tier that can easily accommodate frequent updates (such as a rewriteable tier and/or a tier with greater endurance) and more stable portions of the metadata that are less frequently updated can be maintained in a different tier (such as an erasable tier and/or a tier with lower endurance).

Figure 8:
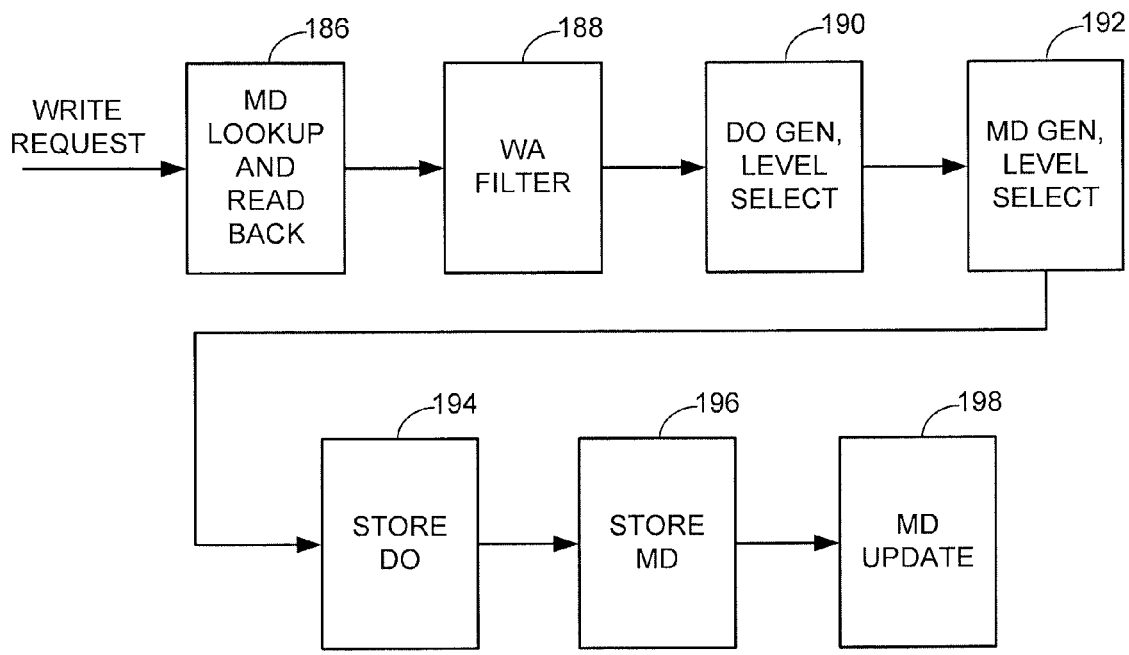
FIG. 8 represents a sequence of steps carried out in accordance with some embodiments to service write requests from a requestor.

FIG. 8 depicts a write operation for a selected LBA, or range of LBAs.

A write command and an associated set of user data are provided from the requestor to the device 100 for storage in the memory structure 104. As before, an initial metadata lookup operation at block 186 locates a previously stored most current version of the data, if such exists. If so, the metadata are retrieved and a preliminary write amplification filtering analysis may take place at block 188 to ensure the newly presented data represent a different version of data such as through the use of the aforementioned hash values 120 in FIG. 2.

The steps described in FIGS. 5-6 above are repeated for the newly presented write data. A data object 112 (FIG. 2) is generated and an appropriate memory tier level is selected at block 190. A corresponding metadata unit 114 (FIG. 2) is generated and an appropriate memory tier level is selected at block 192. The data object is stored at block 194, and the metadata unit is stored at block 196. It will be noted that in the case where a previous version of the data is resident in the memory structure 104, the new data object and the new metadata unit may, or may not, be stored in the same respective memory tier levels as the previous version data object and metadata unit. The previous version data object and metadata may be marked stale and adjusted as required, such as by the addition of one or more forward pointers in the old MD unit to point to the new location, as indicated at block 198.

The metadata granularity is selected based on characteristics of the corresponding data object. As used herein, granularity generally refers to the unit size of user data described by a given metadata unit; the smaller the metadata granularity, the smaller the unit size and vice versa. As the metadata granularity decreases, the size of the metadata unit may increase. This is because the metadata needed to describe 1 megabyte (MB) of user data as a single unit (large granularity) would be significantly smaller than the metadata required to individually describe each 16 bytes (or 512 bytes, etc.) of that same 1 MB of user data (small granularity).

In some cases, the designer may allocate a certain total amount of storage for metadata and the rest for user data (data objects). The question then becomes, how best to allocate the metadata for the data objects. By adaptively adjusting the granularity of the various metadata units based on workload, portions of user data that are accessed in large sets may justify a smaller metadata granularity, whereas portions of user data that are accessed in smaller increments may justify an increase in the metadata granularity for those sets. Once the metadata granularity is adjusted, a further decision opportunity becomes available in that the newly sized metadata may be more effectively stored in a different tier of the memory structure. Thus, in some embodiments, decisions are made with regard to where data objects and metadata units are stored in various tiers and then workload and memory attributes (e.g., endurance, measured performance, aging, etc.) allow both the data objects and the metadata to be moved to locations that support efficient data I/O rates.

Figure 9:
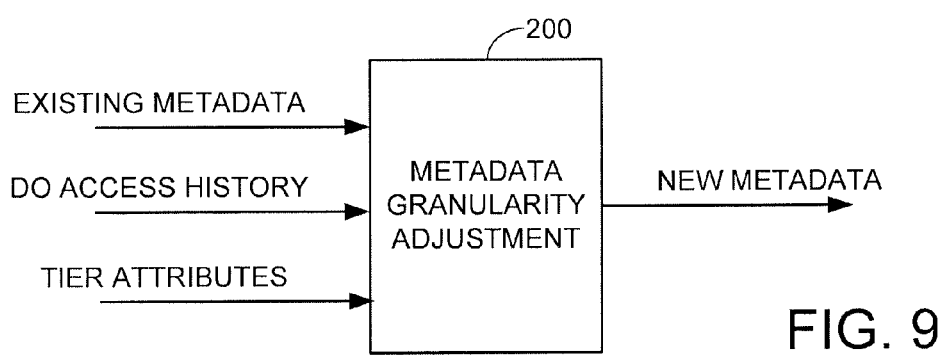
FIG. 9 depicts a metadata granularity adjustment module of the device of FIG. 1 that operates in accordance with some embodiments.

As represented by a metadata granularity adjustment module 200 in FIG. 9, the metadata granularity (and metadata level) may be selected, and subsequently adjusted, based on a number of factors including workload (e.g., read/write counts on the associated data object), throughput/ latency of the various memory tiers, endurance characteristics of the various memory tiers, and actual or predicted wear of the memory tiers and space available in the memory such as in terms of percentage available for each tier or for the total system.

The metadata units are allocated to the various memory tiers according to a memory organization scheme that takes into account memory endurance, speed, power requirements, latency and other memory attribute factors. Data attribute factors include the relative unit sizes of the data objects (see e.g., FIGS. 4A-4B), the update frequency of the data objects, whether the data objects are in a write intensive or read intensive environment, and whether significant read-modify-write operations are carried out. Each of these considerations will be discussed in turn.

With regard to data object size, when a large data object is updated as a unit (see e.g., FIG. 4A), only a relatively small amount of metadata may be required to describe this information. A relatively small metadata unit can be stored in a low bandwidth and low endurance memory tier because the rate of the user data updates in the data object will tend to be relatively low. A small metadata unit can thus be stored downstream from the data object (e.g., the metadata unit in a lower tier and the data object in a higher tier). A slower readback rate for the metadata unit can be accommodated as compared to the readback rate of the corresponding data object since the metadata unit is significantly smaller than the data object.

Conversely, when a relatively smaller data object (see e.g., FIG. 4B) is written frequently with other random small objects in a write intensive environment, the metadata granularity will be adjusted to match the small object size. The location of the metadata will be selected such that the metadata units for the data objects are in a faster rewriteable memory with greater endurance to accommodate a greater frequency of metadata updates.

In a read intensive environment, the granularity of the metadata can be adjusted such that a larger portion, or all, of the metadata can be stored in a memory tier that does not require a large amount of updates. This is because read operations tend to result in relatively smaller (if any) adjustments to the metadata; no changes in address storage location for the data object usually take place unless an error recovery routine is initiated to enable recovery of the data, and so the types of metadata updates for read operations may be limited to metrics such as increments in read counts, observed bit error rates, measured drift, etc.

A read intensive environment may thus enable storage of the metadata in a compressed form to reduce the metadata size. A higher tier of memory can be used based on the reduced size, although the compressed metadata can be placed in any suitable location.

In a read-modify-write environment, a relatively large set of user data is transferred to the device from the requestor with updates, but generally only a small subset of the data blocks are actually updated and the rest remain unchanged. For example, a set of 100 LBAs may be frequently presented as a unit for updating, but only a small number of the LBAs (e.g., 5-10) are actually modified from one write event to the next. In such a case, the device may elect to only store the updates to the changed LBAs and maintain the originally written LBAs in the previous storage location.

A read-modify-write operation may thus include reading the previously stored data object, performing a comparison between the previously stored data object and the new data object to identify those data blocks which have been identified as having been changed, and writing the changed data blocks to the memory structure 104. The metadata granularity may be adjusted to an appropriate level to enable tracking of these changes and allow the device 100 to recover the most current version of the data.

In some embodiments, a read-modify-write environment for large data objects involving many data blocks (LBAs) may result in the writing of the initial data set to an erasable tier (e.g., the flash memory tier 152). Updated LBAs may be written to a rewriteable tier (e.g., the NVRAM, RRAM, PCRAM or STRAM tiers 144-150). Once sufficient workload history has been accumulated (e.g., to be able to distinguish between read-modify-writes and small random writes), the entire data object may be migrated to a more suitable memory tier. The granularity of the metadata may be modified and the modified metadata moved to a more suitable memory tier as well. It can be seen that, generally, the larger the data objects (e.g., data objects involving many LBAs), the more likely it may be that read-modify-writes will occur. Adjusting both the data object and metadata sizes based on workload can thus achieve improved performance levels that balance metadata complexity and granularity with storage capacity and throughput.

It is contemplated, although not necessarily required, that each memory tier in the multi-tiered memory structure 104 will store both data objects and metadata units (albeit not necessarily related to each other). It follows that there will be a trade-off in determining how much memory capacity in each tier should be allocated for the storage of data objects, and how much memory capacity in each tier should be allocated for the storage of metadata. The respective percentages (e.g., X % for data objects and 100-X % for metadata units) for each memory tier may be adaptively adjusted based on the various factors listed above. Generally, it has been found that enhanced performance may arise through the use of higher memory tiers for the metadata in small random write environments so that the granularity of the metadata can be adjusted to reduce the incidence of read-modify-writes on the data objects.

Numerous characteristics and advantages of various embodiments of the present disclosure have been set forth in the foregoing description, together with structural and functional details. Nevertheless, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a multi-tier memory structure comprising a plurality of non-volatile memory tiers each having different data transfer attributes and corresponding memory cell constructions;
a data object storage manager adapted to generate first and second data objects responsive to one or more data blocks supplied by a requestor and to direct storage of the generated data objects in a first non-volatile tier of said memory structure, the first and second data objects having a common unit size; and
a metadata storage manager adapted to generate first and second metadata units, the first metadata unit having a first selected granularity to describe the first data object, and to direct storage of the generated first metadata unit in a second non-volatile tier of said memory structure responsive to the first selected granularity, the metadata storage manager adapted to generate a second metadata unit having a second selected granularity to describe the second data object, the first and second metadata units being different, and to direct storage of the second metadata unit in third non-volatile tier of the memory structure responsive to the second selected metadata unit, the first, second, and third non-volatile tiers being different, the first and second selected granularities each identified responsive to an access rate of the respective first and second data objects and characterized as a resolution in terms of groups of bits of user data in the data objects individually described by respective metadata units.

2. The apparatus of claim 1, in which the second metadata unit is further stored in the second non-volatile tier responsive to an update frequency of the second metadata unit.

3. The apparatus of claim 1, in which each data object comprises at least one user data block supplied by a requestor device for storage in the multitiered memory structure, and each metadata object comprises address information associated with a physical address of the respective data objects in the first non-volatile tier and state information associated with the physical address.

4. The apparatus of claim 1, in which a selected one of the first or second tiers comprises rewriteable non-volatile memory and a remaining one of the first or second tiers comprises erasable non-volatile memory.

5. The apparatus of claim 1, in which the multi-tier memory structure provides a plurality of tiers in sequential order from a fastest tier to a slowest tier, the second tier being slower than the first tier.

6. The apparatus of claim 1, in which the multi-tier memory structure comprises a plurality of non-volatile memory tiers each having different data storage attributes, and the apparatus further comprises selecting the first and second tiers by matching the data storage attributes of the respective first and second data objects to the respective first and second metadata units and the respective first and second tiers.

7. The apparatus of claim 1, in which the first tier has a first data readback rate in terms of continuously transferred data bits per unit time and the second tier has a lower, second data readback rate in terms of continuously transferred data bits per unit time.

8. The apparatus of claim 1, in which the metadata storage manager further monitors access operations associated with the first data object and adjusts the granularity of the first metadata unit in relation to the monitored access operations.

9. The apparatus of claim 8, in which the metadata storage manager further migrates the first metadata unit to the third non-volatile tier of the memory structure responsive to the adjusted granularity of the first metadata unit.

10. The apparatus of claim 8, in which at least one of the plurality of nonvolatile memory tiers comprises an array of erasable memory cells and at least one of the plurality of non-volatile memory tiers comprises an array of rewritable memory cells.

11. The apparatus of claim 1, in which each data object comprises at least one user data block supplied by a requestor device for storage in the multi-tiered memory structure, and each metadata object comprises address information associated with a physical address of the data object in the first non-volatile tier and state information associated with the physical address.

12. The apparatus of claim 1, wherein a first tier in the plurality of non-volatile memory tiers stores a first plurality of data objects and a second plurality of metadata units, wherein none of the second plurality of metadata units describe any of the first plurality of data objects.

13. The apparatus of claim 1, in which the data object storage manager selects the non-volatile first tier for the storage of the first data object responsive to an access history of data blocks associated with the first data object and an attribute of the first tier.

14. The apparatus of claim 1, in which the first tier has a first data readback rate in terms of continuously transferred data bits per unit time and the second tier has a lower, second data readback rate in terms of continuously transferred data bits per the same unit time.

15. The apparatus of claim 1, further comprising a metadata granularity adjustment module which adjusts the granularity of the first metadata unit responsive to an access history associated with the first data object and performance attributes associated with the second tier.

16. The apparatus of claim 1, in which the first tier has a slower transfer rate performance than the second tier, the data object storage manager subsequently directs storage of a third data object to a different, fourth tier of the multi-tier memory structure, the third data object having the common unit size, the metadata storage manager generates and directs storage of a third metadata unit to a different, fifth tier of the multi-tier memory structure, the third metadata unit having a third selected granularity that differs from the first and second selected granularities, the fifth tier has a slower transfer rate performance than the fourth tier.

17. The apparatus of claim 1, in which the metadata storage manager comprises a metadata granularity adjustment module which adjusts the granularity of at least one metadata unit responsive to an access history associated with at least one data object and performance attributes associated with the first memory tier.

* * * * *